United States Patent [19]

Jonnalagadda et al.

[11] Patent Number: 4,958,230

[45] Date of Patent: Sep. 18, 1990

[54] METHOD OF TRANSMITTING AUXILIARY INFORMATION IN A TELEVISION SIGNAL

[75] Inventors: Krishnamurthy Jonnalagadda, Plainsboro; James J. Gibson; Theodor M. Wagner, both of Princeton, all of N.J.

[73] Assignee: General Electric Company, Princeton, N.J.

[21] Appl. No.: 392,820

[22] Filed: Aug. 11, 1989

[51] Int. Cl.⁵ .............................................. H04N 7/00
[52] U.S. Cl. ...................................... 358/186; 358/12; 358/15; 358/11; 358/141
[58] Field of Search ...................... 358/186, 12, 11, 15, 358/141

[56] References Cited

U.S. PATENT DOCUMENTS

| | | | |
|---|---|---|---|
| 2,635,140 | 4/1953 | Dome | 178/5.2 |
| 3,530,232 | 9/1970 | Reiter et al. | 178/5.1 |
| 3,700,793 | 10/1972 | Borsuk et al. | 358/15 |
| 4,660,072 | 4/1987 | Fukinuki | 358/12 |
| 4,670,773 | 6/1987 | Silverberg | 358/12 |

OTHER PUBLICATIONS

Y. Yasumoto et al., "An Extended Definition Television System Using Quadrature Modulation of the Video Carrier with Inverse Nyquist Filter," IEEE Transactions on Consumer Elec., vol. CE-33, No. 3, Aug. 87, pp. 173-180.
Michael A. Isnardi et al., "Decoding Issues in the Actv System," IEEE Transactions on Consumer Elec, vol., CE34 No. 1 Feb. 88, pp. 111-120.
(Translation) "Digital Sound Signals Multiplexed in Quadrature with TV Signals," Hitachi Ltd., Ites 17-- 6-88 p. ?.

Primary Examiner—Howard W. Britton
Assistant Examiner—Michael Lee
Attorney, Agent, or Firm—Joseph S. Tripoli; Eric P. Herrmann; James B. Hayes

[57] ABSTRACT

Apparatus for augmenting a television signal with auxiliary signal includes circuitry for modulating a picture carrier with baseband video signal to generate a vestigial sideband television signal. Auxiliary signal is modulated on a further carrier of such frequency that the upper sidebands of the modulated further carrier, representing the auxiliary information, (1) occupy the frequency spectrum of the vestigial sideband of the vestigial sideband television signal and (2) occur clustered at odd multiples of half line frequency. The sidebands of the modulated further carrier are added to the vestigial sideband television signal in frequency interleaved fashion in the vestigial sideband spectral region.

14 Claims, 4 Drawing Sheets

METHOD OF TRANSMITTING AUXILIARY INFORMATION IN A TELEVISION SIGNAL

This invention relates to apparatus for adding auxiliary signal to a television signal for transmission.

BACKGROUND OF THE INVENTION

This invention will be described in terms of including high frequency luminance information in a broadcast television signal but is not intended to be limited to this application.

Recently extended definition television (EDTV) systems have been proposed wherein additional picture information is compatibly included in broadcast television signals. Conventional television receivers are not affected by the additional information but special EDTV receivers utilize the additional information to reproduce higher quality images. For example Yoshio Yasumoto et al. in a paper entitled "An Extended Definition Television System Using Quadrature Modulation of the Video Carrier with Inverse Nyquist Filter", (IEEE Transactions on Consumer Electronics, Vol. CE-33, No. 3, Aug. 1987, pp. 173-180) describe a system wherein high frequency luminance signal (4.2-5.2 MHz) is heterodyned to the frequency range of 0.2-1.2 MHz and then used to quadrature modulate the picture carrier. The quadrature modulated carrier is then added to the standard broadcast television signal for transmission. In this arrangement the additional signal is included, at least in part, in the vestigial sideband of the broadcast signal.

Takahiko Fukinuki in U.S. Pat. No. 4,660,072 describes a system for adding high frequency luminance to a broadcast television signal by modulating a carrier having a frequency equal to ½ the chrominance subcarrier frequency with the high frequency luminance information. This modulated carrier is added to baseband composite video signal prior to RF modulation for transmission. In this arrangement, the additional signal occupies a frequency range which includes the normal chrominance signal.

In both of the above systems the added signal occupies a frequency range which is detected by conventional receivers, and may tend to introduce artifacts in the reproduced image where the transmission path is less than ideal.

It is an object of the present invention to provide a method and apparatus for including additional information compatibly in a standard video signal with a minimum of interference or artifacts in reproduced images.

SUMMARY OF THE INVENTION

In the present invention, video signal is encoded in composite video format and double sideband modulated on an RF carrier. Auxiliary signal, conditioned to have its energy clustered at multiples of the horizontal line frequency of the video signal, is modulated onto a second RF carrier. The second RF carrier is selected so that at least one sideband component of the modulated second RF carrier, representing the auxiliary signal, will fall into the lower sideband spectrum of the modulated composite video in frequency interleaved format with the modulated composite video signal. The RF modulated composite video signal and the RF modulated auxiliary signal are combined to form a television signal for transmission.

DETAILED DESCRIPTION

Figure 1:
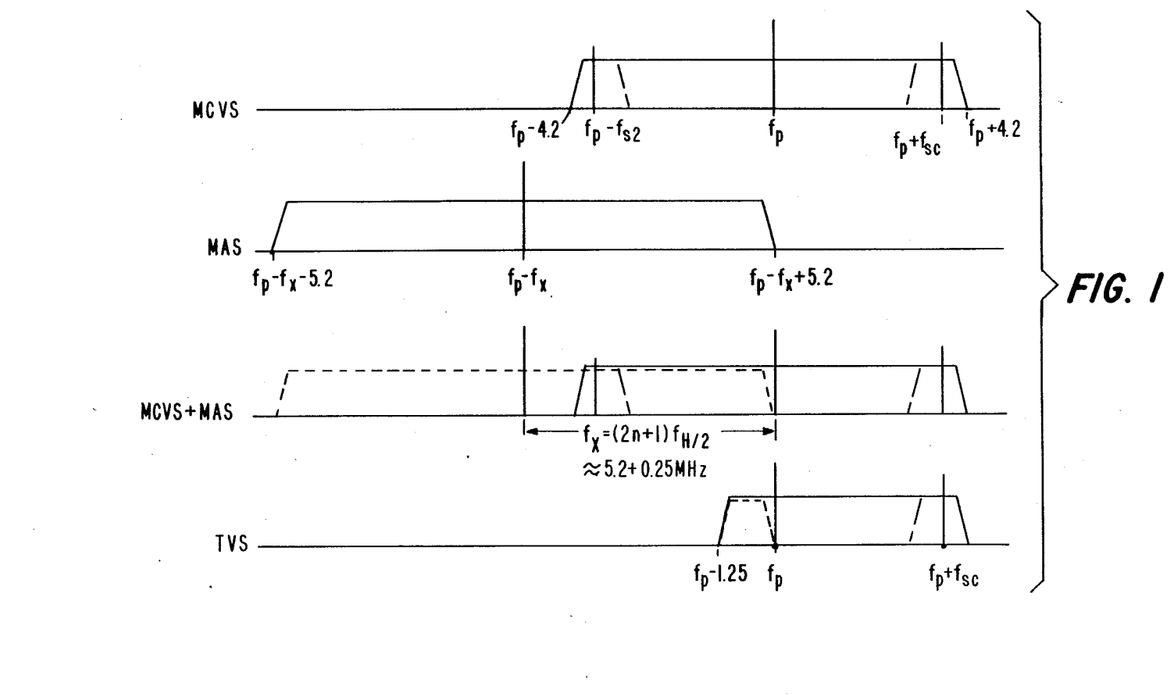
FIG. 1 includes spectral representations of composite video and auxiliary signal useful in understanding the invention.

Referring to FIG. 1, the spectral diagram labeled MCVS corresponds to a composite video signal modulated on a picture carrier of frequency $f_p$. The double sideband response represents a standard television signal before being vestigial sideband filtered and before the sound carrier is added. The frequency $f_{sc}$ corresponds to the chrominance subcarriers. Note that the video information has a bandwidth of 4.2 MHz which corresponds to a standard NTSC video signal.

The spectral diagram labeled MAS corresponds to an auxiliary signal modulated on a carrier of frequency $f_p - f_x$. In this instance the auxiliary signal is assumed to be a wideband luminance signal having frequency components from zero to 5.2 MHz. (The luminance component of the composite signal has frequency components from zero to 4.2 MHz.) Since the auxiliary signal is a luminance signal, it inherently has its energy clustered at multiples of the horizontal line frequency. Also it will be appreciated by those skilled in the art of video signal processing, that in the frequency range of zero to approximately 2 MHz, composite video signal consists of the lower frequency components of luminance signal which also has its energy clustered at multiples of the horizontal line frequency. Since it is desired to combine the signals MCVS and MAS without mutual interference, that is in frequency interleaved fashion, the carrier $f_p - f_x$ is selected to differ from the picture carrier by an odd multiple of one-half the horizontal line frequency $f_H$. Thus the frequency $f_x$ is selected equal to $(2n+1)$ where n is an integer. Only the auxiliary signal frequency components from 4.2-5.2 MHz are to be added to the transmitted signal and these components are to fall in the vestigial sideband of the transmitted signal. Further it is undesirable that added signal be included within 0.25 MHz of the picture carrier of the transmitted signal to insure that the added signal does not interfere with intercarrier sound detection systems of conventional receivers. Therefore the frequency $f_x$ is approximately equal to $5.2 + 0.25$ MHz and must equal $(2n+1)f_H/2$. These conditions are satisfied if a value of, e.g. 346 is selected for n.

The spectrum labeled MCVS+MAS illustrates the combined signals represented by the spectra MCVS and MAS. The signal represented by the combined spectrum may be filtered in a vestigial sideband filter to produce the spectrum labeled TVS which represents the spectrum of an EDTV video signal conditioned for transmission (prior to the addition of a sound signal). However, it is preferable to vestigial sideband filter the composite video signal MCVS and to bandpass filter the auxiliary signal MAS to pass the portion of the frequency spectrum of the signal MAS to be included in the vestigial sideband prior to combining the signals to form the signal TVS.

Figure 2:
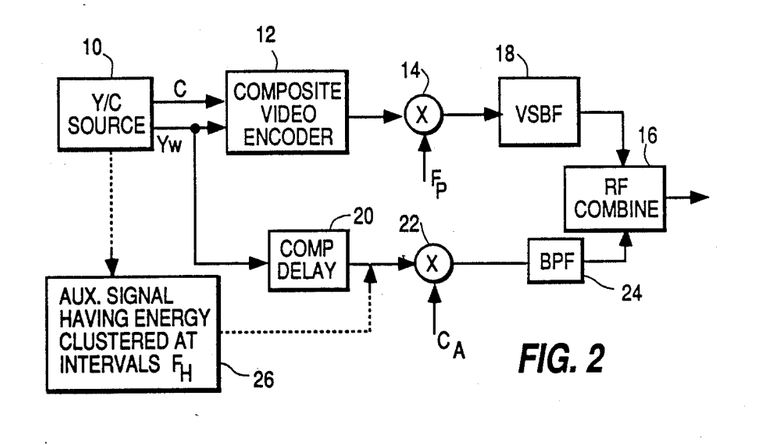
FIGS. 2, 3 and 4 are block diagrams of alternative signal encoding and combining apparatus for generating compatible television signals.

FIG. 2 illustrates a first embodiment of apparatus for generating the signal represented by the spectrum TVS of FIG. 1. In FIG. 2, a source 10, which may be a video camera, provides chrominance, C, and luminance, Yw, components of a video image. It is assumed that the luminance component, Yw, is wideband, that is, it includes a signal bandwidth in excess of the standard 4.2 MHz (NTSC) transmitted in a conventional standard television signal. For example the signal Yw may have a bandwidth of 5.2 MHz.

The chrominance, C, and luminance, Yw, signal components are coupled to a composite video encoder 12 which generates a baseband composite video signal. The baseband composite video signal may be of conventional composite video format or an augmented composite video signal of the type in U.S. Pat. No. 4,660,072 or of the type described in U.S. Pat. No. 4,670,773. In both patents the composite signal is augmented with high frequency luminance but the techniques illustrated may be employed to augment the composite signal with other information, such as side panel information in a compatible widescreen EDTV signal. Baseband composite signal from the encoder 12 is coupled to a mixer 14 wherein it modulates an RF picture carrier of frequency $f_p$. The modulated picture carrier is coupled, via a vestigial sideband filter 18, to a combiner 16 wherein it is combined with auxiliary signal to produce a signal having a spectrum as illustrated in FIG. 1 (TVS). The vestigial sideband filter has a standard vestigial sideband response characteristic for conditioning an RF television signal for transmission.

The wideband luminance signal Yw from the source 10 is coupled to a delay element 20 which time aligns the luminance signal Yw with the composite video signal produced by the encoder 12. Delayed wideband luminance signal Yw is applied to a mixer 22 wherein it modulates an RF carrier $C_A$ of frequency $f_p-(2n+1)f_H/2$. The value n is determined as described above. The modulated luminance signal from the mixer 22 is coupled, via a bandpass filter 24, to the combiner 16 wherein it is additively combined with the modulated composite signal. The bandpass filter 24 has a passband selected to pass the portion of one sideband of the carrier $C_A$ representing the band of luminance frequencies between 4.2 and 5.2 MHz.

In an alternative arrangement signal other than high frequency luminance may be used as the auxiliary signal. This other auxiliary signal may, for example, represent line, field or frame difference signals useful in converting interlaced signals to non-interlaced signals at the receiver. Alternatively, it may include auxiliary audio signals such as digital audio signals. In FIG. 2, the alternative auxiliary signal is generated and/or conditioned in the circuitry 26 to have its energy clustered at multiples of the horizontal line frequency of the composite video signal. The alternative auxiliary signal from element 26 is coupled to the mixer 22 wherein it modulates the carrier $C_A$ of frequency $f_p-(2n+1)f_H/2$. Depending upon the magnitude of the energy of the auxiliary signal relative to the energy of the composite video signal it may be desirable to include circuitry in the auxiliary signal path to compress or attenuate the amplitude of the auxiliary signal.

Figure 3:
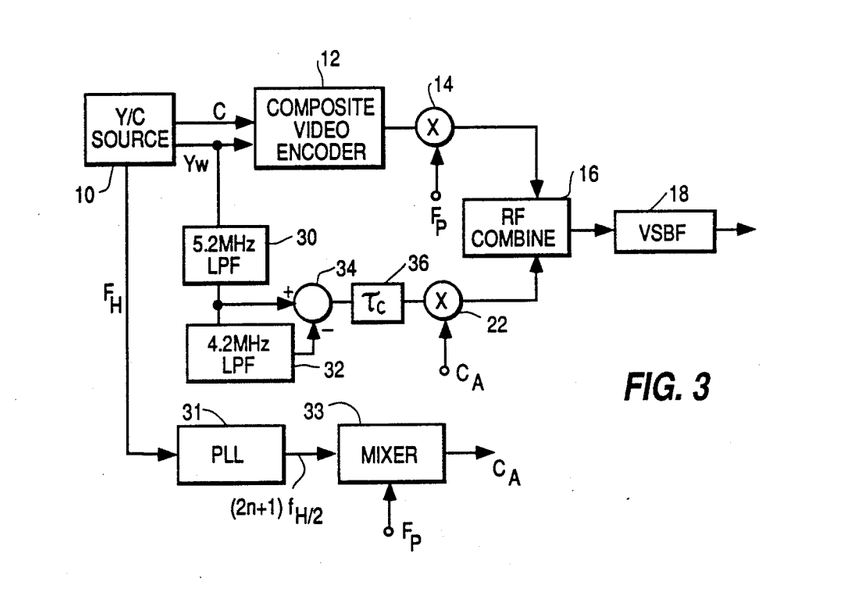

FIG. 3 illustrates an alternative embodiment of the invention. Circuit elements designated with like numerals as elements in FIG. 2 are similar and perform like functions. In FIG. 3 the wideband luminance signal Yw from the source 10 is coupled to a lowpass filter 30 to limit its frequency bandwidth to 5.2 MHz. The 5.2 MHz band limited signal is coupled to a bandpass filter consisting of a 4.2 MHz lowpass filter 32 and a signal subtracter 34. The output signal provided by the subtracter 34 is limited to the frequency band of 4.2-5.2 MHz, which corresponds to the desired auxiliary high frequency luminance signal. The bandpass filtered signal from subtracter 34 is coupled to the mixer 22 via a compensating delay element 36. In the FIG. 3 embodiment the auxiliary signal is bandpass filtered prior to modulation to preclude generation of unnecessary frequency components which may undesirably couple into the composite signal. In the FIG. 3 embodiment the signals are vestigial sideband filtered subsequent to being combined in the combiner 16. However, as mentioned previously it is preferable to filter the two signals prior to combining them.

The carrier signal $C_A$ frequency $f_p-2n+1)f_H/2$ applied to the mixer 22 in FIGS. 2 and 3 may be generated by conventional circuitry as follows. The horizontal synchronizing signal $F_H$ (or a multiple thereof) from, for example, either the source 10 or the composite video encoder 12, is applied to a conventional phase locked loop circuit 31 which generates a signal of frequency $(2n+1)f_H/2$. This signal is applied to a mixer 33 having the picture carrier $F_p$ as a second input. The mixer 33 generates signals of frequencies $f_p\pm(2n+1)f_H/2$ and the frequency $f_p-(2n+1)f_H/2$ is selected by appropriate filter circuitry.

In the apparatus of both FIG. 2 and FIG. 3, the resultant output signal TVS includes a modulated composite video signal with auxiliary information frequency interleaved in the vestigial sideband and with no carrier associated with the auxiliary information. The auxiliary information is precisely located at multiples of the horizontal line frequency of the composite signal, by virtue of the auxiliary carrier being generated from both the picture carrier and the video horizontal line synchronizing signal $F_H$. Both of these signals are available at the receiver, hence a precise auxiliary signal demodulation carrier can be generated at the receiver without including a separate, auxiliary reference carrier in the transmitted signal.

Figure 4:
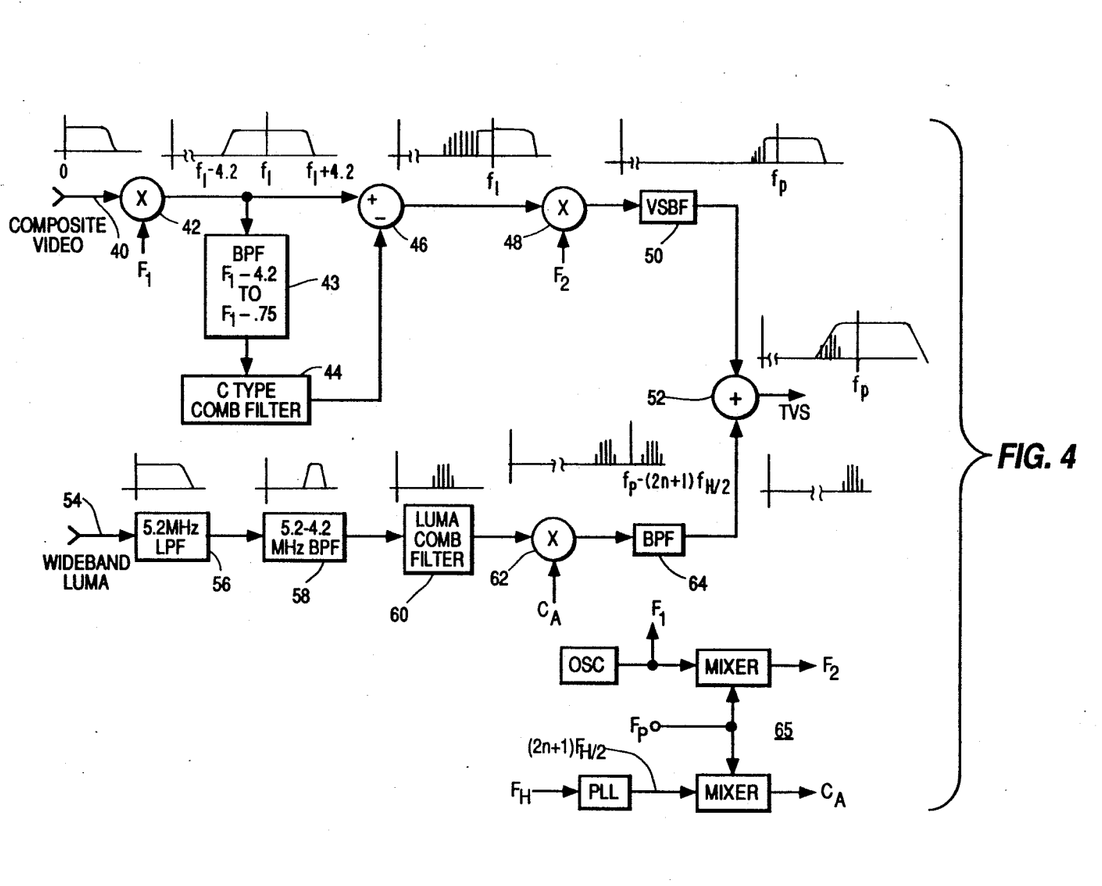

FIG. 4 illustrates a further embodiment of the invention wherein both the composite signal and the auxiliary signal are preconditioned by comb filtering prior to being combined. That is, the portion of the composite signal representing the vestigial sidebands is comb filtered to remove signals having frequency components located between integer multiples of the horizontal line frequency and similarly the auxiliary signal is comb filtered to remove signals having frequency components located between integer multiples of the line frequency. In so doing, when the auxiliary and composite signals are ultimately combined there will be no cross interference between the respective signals.

In FIG. 4 baseband composite video signal, from, e.g., an encoder 12, is coupled via a connection 40 to a mixer 42. In the mixer 42, the baseband composite video signal double sideband modulates a carrier of frequency $f_1$ (e.g., 10 MHz). This generates a signal having components located in the lower sideband which corresponds to those present in the vestigial sideband of the transmitted signal. The modulated signal from the mixer 42 is coupled to a subtracter 46 and a bandpass filter 43. The bandpass filter has a passband to pass the lower sideband of the modulated signal or at least the band of frequencies between $f_1-1.25$ MHz and $f_1-0.75$ MHz.

The bandpass filtered signal from filter 43 is coupled to a "C" type comb filter which attenuates signal having frequency components at integer multiples of the horizontal line frequency and passes signal having frequency components at odd multiples of one-half the line frequency. The comb filtered signal from the filter 44 is subtracted from the modulated composite signal in subtracter 46. The resultant signal provided by the subtracter 46 has a lower sideband which is comb filtered and an upper sideband which is not comb filtered. The comb filtered lower sideband includes signal energy clustered at integer multiples of the line frequency. The entire lower sideband may be comb filtered. It is preferred however that only that part of the frequency spectrum which is included in the roll-off portion of the vestigial sideband response be comb filtered, e.g., from $f_1-0.75$ MHz to $f_{1-}1.25$ MHz.

The signal provided by the subtracter 46 is coupled to a mixer 48 wherein it is modulated by a carrier F2, of frequency $f_p-f_1$, to produce a signal component representing composite video signal modulating a desired picture carrier of frequency $f_p$. Signal from the mixer 48 is applied to a filter 50 including at least a vestigial sideband filter. The output provided by the filter 50 is an RF vestigial sideband television signal wherein at least a portion of the vestigial sideband is comb filtered. This signal is coupled to one input terminal of a signal combining circuit 52.

Auxiliary signal, illustratively exemplified as wideband luminance, from, for example source 10 (FIG. 2) is applied to the cascade connection of lowpass and bandpass filters 56 and 58. The signal provided by the cascaded filters represents the luminance signal components in the frequency band between 4.2 MHz and 5.2 MHz. This signal is applied to a conventional luminance comb filter circuit 60 which attenuates signal having frequency components located between integer multiples of the line frequency. The comb filtered auxiliary signal is coupled to a mixer 62 wherein it modulates a carrier $C_A$ of frequency $f_p-(2n+1)f_H/2$. The value n is selected to locate the upper sidebands of the modulated auxiliary signal, representing the 4.2–5.2 MHz band of auxiliary signal, in the band of frequencies occupied by the vestigial sideband of the modulated composite video signal, such that the band of auxiliary signal occurs at odd multiples of one-half the line frequency.

The modulated auxiliary signal is bandpass filtered in filter 64 which passes the upper sidebands of the modulated signal. The signal provided by the filter 64 is added to the modulated composite video signal in the combiner 52 to produce a signal having a spectral response similar to the response TVS illustrated in FIG. 1.

Note that the two filter elements 50 and 64 may be eliminated and a single vestigial sideband filter inserted at the output of the signal combiner 52. The carriers F1, F2 and CA may be generated from a picture carrier, $F_p$, horizontal synchronizing signal $F_H$ and an oscillator by conventional methods exemplified by the circuitry 65.

Figure 5:
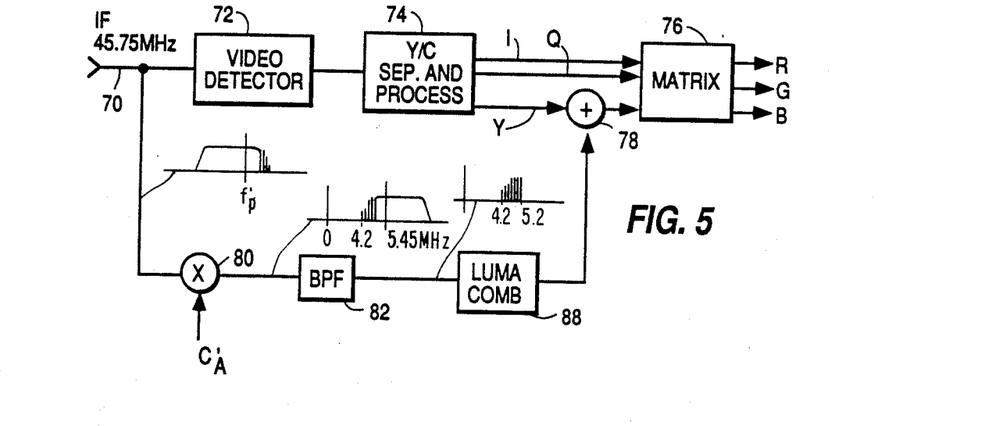
FIGS. 5, 6 and 7 are block diagrams of exemplary receiver apparatus for processing compatible television signals including additional information.

FIG. 5 illustrates circuitry in a receiving apparatus for utilizing auxiliary signal transmitted compatibly with a standard television signal. In the exemplary embodiment the auxiliary signal is assumed to be a high frequency luminance component.

Referring to FIG. 5, the augmented signal is coupled to a connection 70. This signal is presumed to be sourced from the intermediate frequency section of a standard RF/IF tuner section of a television signal receiver. The signal is tapped prior to the Nyquist filter of the IF circuitry. As such the vestigial sideband of the signal is intact, and the IF picture carrier of frequency $f_p'$ is assumed to be located below the vestigial sideband.

The signal at connection 70 is coupled to a video detector 72 which includes a Nyquist filter. Detector 72 generates baseband composite video signal in a conventional manner and applies the baseband composite video signal to processing circuitry 74. The Nyquist filter response substantially eliminates the auxiliary signal from the baseband composite video signal provided by the video detector 72. Processing circuitry 74 includes conventional video signal processing circuitry. Processing circuitry 4, for example, separates the chrominance and luminance components and performs contrast, hue and saturation functions on the respective signals. The chrominance signals are coupled to a matrix circuit 76. The luminance signal is coupled through an adder 78 to the matrix circuitry 76. The high frequency luminance auxiliary signal is added to the luminance component in the adder 78. The matrix circuitry 76 combines the luminance and chrominance components to generate primary color signals for energizing a display device (not shown).

The IF signal at connection 70 is also coupled to a mixer 80 wherein it is heterodyned by a carrier $C_A'$ of frequency $f_p'+(2n'+1)f_H/2$ where $f_p'$ is the IF picture carrier. The mixer 80 generates a component wherein the vestigial sideband is located below the picture carrier. The value n' is selected such that the sidebands of the auxiliary signal are located precisely at the frequencies at which they originated. The signal provided by the mixer 80 is coupled to a bandpass filter, 82, which passes the band of frequencies of the vestigial sideband occupied by the auxiliary signal. The output of the bandpass filter 82 is coupled to a luminance comb filter 88. Note that heterodyning the IF signal with a frequency $f_p'+(2n'+1)f_H/2$ shifted the luminance components of the composite video signal in the vestigial sideband to spectral clusters at odd multiples of one-half the line frequency. As such the luminance comb filter 88 substantially eliminates the luminance components of the composite video signal and passes the auxiliary (high frequency luminance) signal. The output of the comb filter 88 is coupled to the adder 78, wherein the auxiliary high frequency luminance signal is added to the standard luminance signal. Note it may be necessary to include a compensating delay element in the auxiliary signal path.

It will be appreciated by those skilled in the art of video signal processing that the circuit elements 80, 82 and 88, may be cascade connected in any order. Constraints on the order selected are determined by the frequency response capabilities of the particular circuit elements utilized.

Figure 6:
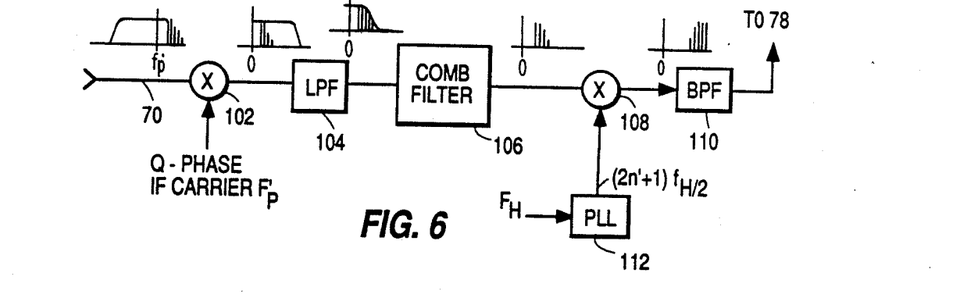

FIG. 6 illustrates alternative circuitry to elements 80, 82 and 88 for extracting the auxiliary signal from the received signal on the IF carrier. In FIG. 6 the IF signal on connection 70 is coupled to a mixer 102 which multiplies the IF signal by a carrier having a frequency equal to the IF picture carrier $f_p'$ but having a quadrature phase relationship therewith. The augmented television signal is frequency shifted to baseband by the mixer 102. Multiplying a modulated carrier by a quadrature phase carrier will nominally produce quadrature phase components of the modulated carrier (the auxiliary signal) separated from in-phase components (the composite video signal). However, because the in-phase components (composite video signal) are not symmetric about the carrier $F_p$ due to the vestigial sideband frequency characteristic, the signal provided by the mixer 102 takes the following form. In the frequency band from zero Hertz to 0.75 MHz the baseband signal will contain only the auxiliary signal. In the frequency range above 0.75 the baseband signal will include auxiliary signal and residual components of the composite signal.

The output signal from mixer 102 is applied to a lowpass filter 104 which has a passband limited to the frequency spectrum of the auxiliary signal, e.g., 1.25 MHz. The lowpass filtered baseband signal is coupled to a comb filter 106 which is arranged to substantially attenuate the interleaved residual luminance signal of the composite signal. (Note the placement of the lowpass filter 104 and comb filter 106 may be interchanged.) The frequency components of the comb filtered auxiliary signal are in reverse order relative to the frequency components of the auxiliary signal prior to encoding. That is, frequency components in the band 0.25–1.25 MHz of the comb filtered decoded auxiliary signal correspond to the band of frequencies 5.2–4.2 MHz of the original auxiliary signal respectively. The comb filtered auxiliary signal is applied to a mixer 108, which is responsive to a signal of frequency $(2n'+1)f_H/2$, to frequency shift and reorder the frequency components of the decoded baseband auxiliary The signal of frequency $(2n'+1)f_H/2$ is generated in a phase locked loop circuit 112 responsive to a horizontal synchronizing signal derived from either the video detector 72 or the processing circuit 74.

Frequency shifted baseband auxiliary signal is bandpass filtered in a filter element 110 and then applied to the decoded composite signal for example via adder 78. The filter 110 has a passband equal to the frequency spectrum of the frequency shifted auxiliary signal, e.g., 4.2–5.2 MHz.

In FIG. 6 the mixer 108 may be inserted immediately after the mixer 102 and the lowpass filter eliminated. However, the arrangement illustrated in FIG. 6 requires a simpler comb filter structure since the signal to be comb filtered in that arrangement has relatively low frequency components.

Figure 7:
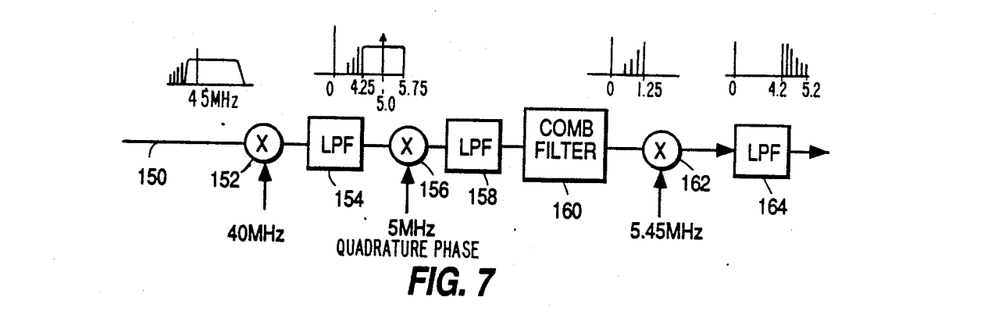

FIG. 7 illustrates a further alternative which improves upon the performance of the FIG. 6 embodiment. Information included in the vestigial sideband can be extracted substantially exclusive of the composite video signal by quadrature phase demodulation if the signal applied to the quadrature demodulator has a frequency characteristic which is symmetric about the picture carrier. However, in order to develop such a characteristic, without loss of auxiliary signal in the vestigial sideband, it is necessary to know precisely the vestigial sideband frequency characteristic. In general, this is not possible since the vestigial sideband frequency characteristics change from channel to channel. The circuitry in FIG. 7 effectively symmetrizes the IF signal by using an intermediate IF carrier.

In FIG. 7 the IF signal is accessed prior to the receiver's Nyquist filter, and in this example is presumed to have the vestigial sideband below the IF picture carrier. The IF signal having an IF carrier of, e.g. 45 MHz, is coupled via a connection 150 to a mixer 152 wherein it is multiplied by a carrier of 40 MHz to frequency shift the IF signal to an IF carrier of 5 MHz. The frequency shifted signal is applied to a low pass filter 154 having a cutoff frequency of 5.75 MHz. Filter 154 provides a signal in which the upper sideband is cut off at a frequency, relative to the 5 MHz carrier that is symmetric with the cutoff frequency of the vestigial sideband. The lowpass filtered IF signal is applied to a mixer 156 wherein it is multiplied with a 5 MHz carrier that is in quadrature phase with the 5 MHz IF carrier. The output signal provided by the mixer 156, is a baseband signal. Spectral components of the baseband signal, corresponding to the frequency band 4.25–5.75 MHz of the signal provided by the lowpass filter 154, consist of auxiliary signal components exclusive of composite video signal components. Spectral components of the baseband signal corresponding to the frequency band 3.75–4.25 MHz include auxiliary signal components and some residual composite video signal components, which residual composite video signal components are significantly reduced compared with the residual composite video signal components in the signal provided by the mixer 102 of FIG. 6.

Output signal from the mixer 156 is lowpass filtered in the filter 158 which passes the frequency spectrum from zero to 1.25 MHz. This signal is then comb filtered in filter 160 to substantially attenuate the residual composite video signal components. The spectral components of the signal provided by the comb filter 160 are in reverse order and located in the wrong frequency space. These spectral components are translated to the frequency band of 4.2–5.2 MHz and reversed in order by multiplying the comb filtered signal with a carrier of 5.45 MHz in a mixer 162. The output of the mixer is a double sideband signal about the carrier of 5.45 MHz. The lower sideband, containing the desired spectral components, is extracted via a lowpass filter 164 having a cutoff frequency of 5.2 MHz.

What is claimed is:

1. Apparatus for augmenting a television signal having information occurring at a horizontal line rate $f_H$, with an auxiliary signal, said apparatus comprising:

respective means for providing a video signal and an auxiliary signal;

means for providing a picture carrier of frequency $f_p$;

means responsive to said picture carrier and said video signal for generating a vestigial sideband modulated RF video signal;

means responsive to said picture carrier and said auxiliary signal for generating an RF auxiliary signal having an RF carrier outside of the frequency spectrum occupied by said vestigial sideband modulated RF video signal, and having a sideband representing said auxiliary signal, occurring in the frequency spectrum occupied by the vestigial sideband of said vestigial sideband RF video signal; and means for including said sideband of said RF auxiliary signal exclusive of said RF carrier, in the vestigial sideband spectrum of said RF video signal.

2. Apparatus for augmenting a television signal having information occurring at a horizontal line rate $f_H$, with an auxiliary signal, said apparatus comprising:

respective means for providing a video signal and an auxiliary signal both of which have their energy clustered in spectral locations at multiples of said line rate at least over a portion of the respective signal bandwidth;

means for providing a picture carrier of frequency $f_p$;

means responsive to said picture carrier and said video signal for providing a vestigial sideband RF video signal;

means, responsive to said picture carrier and said auxiliary signal, for generating a modulated RF carrier signal having sideband representing said auxiliary signal, which sidebands are located in the spectrum occupied by the vestigial sideband of said RF video signal and which sidebands occur at odd multiples of one-half said line rate, and wherein the frequency of said RF carrier is located outside the spectrum occupied by the vestigial sideband of said modulated RF video signal; and means for providing a combined signal exclusive of the carrier of said modulated RF carrier signal and including at least a portion of said sideband representing said auxiliary signal, frequency interleaved with said vestigial sideband RF video signal, in the vestigial sideband spectrum of said vestigial sideband RF video signal.

3. The apparatus set forth in claim 2 wherein said video signal includes a wideband luminance component and said means for providing a vestigial sideband RF video signal includes means for including only a lower frequency portion of said wideband luminance component in said vestigial sideband RF video signal, and said means for providing said auxiliary signal includes means responsive to said wideband luminance component for selecting at least a higher frequency portion of said wideband luminance component as said auxiliary signal.

4. The apparatus set forth in claim 3 wherein said means for generating a modulated RF carrier signal includes:

means responsive to said picture carrier for generating a further carrier having a frequency of $f_p-(2n+1)f_H/2$, wherein n is an integer greater than 80; and means for modulating said further carrier with said auxiliary signal.

5. The apparatus set forth in claim 2, wherein said means for generating a modulated RF carrier includes:

means responsive to said picture carrier for generating a further carrier having a frequency of $f_p-(2n+1)f_H/2$ where n is an integer; and means for modulating said further carrier with said auxiliary signal.

6. The apparatus set forth in claim 2 wherein said means for providing a vestigial sideband RF video signal includes:

means responsive to said picture carrier for translating the frequencies of said video signal by a frequency $f_x$;

comb filter means for comb filtering the portion of the spectrum of the translated video signal corresponding to the vestigial sideband of the vestigial sideband RF video signal; and means responsive to said picture carrier for translating the frequencies of the comb filtered translated video signal by a frequency $f_p-f_x$.

7. The apparatus set forth in claim 6 wherein said means for generating a modulated RF carrier signal includes means for comb filtering said auxiliary signal.

8. The apparatus set forth in claim 2 wherein said means for generating a modulated RF carrier signal includes means for comb filtering said auxiliary signal.

9. Apparatus for augmenting a television signal having information occurring at a line rate $f_H$, with an auxiliary signal, comprising:

a video input terminal for applying a video signal;

an auxiliary input terminal for applying an auxiliary signal;

a carrier input terminal for applying a picture carrier signal of frequency $f_p$;

means coupled to said video input terminal for generating a baseband composite video signal;

means, responsive to said baseband composite video signal and said picture carrier signal, for double sideband modulating said picture carrier signal with said baseband composite video signal, to produce a modulated picture signal;

means responsive to said picture carrier signal for generating a further carrier signal having a frequency equal to $f_p$ minus an odd multiple of one-half the rate $f_H$;

means responsive to said further carrier signal and said auxiliary signal for modulating said further carrier signal with said auxiliary signal to produce a modulated signal having sidebands representing said auxiliary signal;

means for combining said sidebands representing said auxiliary signal with said modulated picture signal wherein said sidebands are located in the frequency spectrum occupied by the lower sideband of said modulated picture signal, to produce a combined signal exclusive of said further carrier.

10. The apparatus set forth in claim 9 wherein said means for double sideband modulating said picture carrier includes:

means for providing a third carrier signal of frequency $f_x$ which frequency is relatively low compared to the frequency of said picture carrier;

means for modulating said third carrier with said baseband composite video signal to provide an intermediate double sideband modulated signal;

comb filter means, for comb filtering at least a portion of the lower sideband of said intermediate double sideband modulated signal;

means for providing a carrier of frequency $f_p-f_x$; and means, responsive to signal provided by said comb filter means and said carrier of frequency $f_p-f_x$, for generating a modulated picture signal having a carrier signal frequency $f_p$.

11. The apparatus set forth in claim 10 wherein the means for modulating said further carrier signal with said auxiliary signal includes means for comb filtering said auxiliary signal.

12. Television signal receiver apparatus for detecting a vestigial sideband television signal including a picture carrier, and including an auxiliary signal frequency interleaved with composite video signal in the spectrum occupied by the vestigial sideband of said vestigial sideband television signal and wherein said auxiliary signal is absent a carrier signal, said receiver apparatus comprising:

means responsive to said vestigial sideband television signal for detecting said baseband composite video signal;

means responsive to said baseband composite video signal for generating at least one of a chrominance and a luminance component signal;

mixer means, for demodulating said vestigial sideband television signal in quadrature with said picture carrier and frequency translating spectral components of said auxiliary signal by odd multiples of one half the horizontal line frequency of said composite video signal;

filter means having a passband including frequencies corresponding to the vestigial sideband of a vestigial sideband signal applied thereto;

comb filter means having spectral passbands for passing said auxiliary signal; and means for coupling said mixer means, said filter means and said comb filter means in a cascade arrangement and responsive to said vestigial sideband television signal to produce separated auxiliary signal.

13. The apparatus set forth in claim 12 further including means for combining said separated auxiliary signal with said at least one of a chrominance and luminance component signal.

14. The apparatus as set forth in claim 12 wherein said mixer means includes a first mixer, responsive to said vestigial sideband television signal and to a carrier signal quadrature phase related to said picture carrier, for demodulating said vestigial sideband television signal, and a second mixer responsive to a carrier signal having a frequency which is an odd multiple of one half the horizontal line frequency of said composite video signal, for translating frequency components of signal applied thereto by multiples of one half said horizontal line frequency, and wherein said filter means, said comb filter means and said second mixer are serially coupled to said first mixer in the order recited.

* * * * *